Patented Jan. 1, 1929.

1,697,543

UNITED STATES PATENT OFFICE.

PAUL SEIDLER, OF ANHALT, GERMANY.

METHOD OF PRODUCING BIG CRYSTALS.

No Drawing. Application filed November 23, 1926, Serial No. 150,381, and in Germany November 30, 1925.

The present invention relates to a method of producing big crystals and especially to a method of producing big crystals of ammonium chloride.

As is known ammonium chloride crystallizes from aqeous solutions in loose, feathery crystals. Short, compact crystals are usually obtained by slowly cooling hot saturated ammoniacal solutions. These crystals, which are known in the German industry as "hundezähne" (dogs' teeth) are however only of medium size.

It has now been found, that the presence of vegetable substances or of aqueous extracts of such substances will effect a remarkable influence upon the formation of the crystals, in that the size of the obtained crystals will increase considerably. This effect can f. inst. be observed when the ammonium chloride lye in the crystallizing-pans during the cooling permanently is held in contact with wood, f. inst. by depositing wood in the form of boards in the lye.

For the practical accomplishment of the new method plants or parts of plants of any kind of aqueous extracts of all sorts of plants may be used, such as f. inst. grasses, woods, leaves, stalks, foliage, barks, roots, fruits, seeds etc.

When hot, concentrated solutions of ammonia chloride are added to substances of the above mentioned kind the effect will be that big and firm crystals are formed. It is not necessary to use the plants or plant parts concerned in a fresh condition. They also yield efficient extracts when dried, as, for example, meadow hay, dry shreds of sugar beet, dried malt-germs etc.

It has often been found advantageous in preparing the extracts, to add certain substances, to the water, such as different acids. It may also be recommendable to carry out the crystallization-process in an acidic solution, especially in cases in which wood or wood extracts are used. This is however not necessary, as the desired results also will be obtained in a neutral or alkaline solution.

Example 1.—2600 kg. of ammonium chloride are dissolved at 90 at 95° C. in water to a volume of 6000 liters. This solution is acidified by the addition of 40 kilograms of hydrochloric acid of 20° Bé. Whereupon about 150 liters of a filtered plant extract are added which have been obtained by digesting for a period of one day 40 kilograms of sawdust from coniferous wood with about 200 liters of hot water and 4 kg. of hydrochloric acid of 20° Bé. In an acid-resistive tank the mixture is allowed to cool undisturbedly, at so slow a rate that its temperature in the course of 10 to 12 days successively sinks to the outside temperature. During the cooling the tank must be kept covered. At the end of the above mentioned cooling period the mother liquor is removed and the obtained crystals are taken out of the tank and centrifugated and dried.

Example 2.—2600 kg. of ammonium chloride are dissolved at 90 to 95° C. in water to a volume of 6000 liters. To this solution about 150 liters of a filtered extract of fieldhay are added, which extract has been obtained by digesting for a period of one day 40 kg. of dried field-hay with 200 liters of hot water and 4 kg. of hydrochloric acid of 20° Bé. In an acid-resistive tank the mixture is allowed to cool undisturbed, at so slow a rate that its temperature in the course of 10 to 12 days successively sinks to the outside temperature. During the cooling the tank must be kept covered. At the end of the above mentioned cooling period the mother liquor is removed and the obtained crystals are taken out of the tank and centrifugated and dried.

The method can be very considerably varied inasmuch as on the one side the concentration and the temperature of the ammonium chloride solution to be crystallized vary within wide limits, and on the other side varying quantities of decoctions more or less rich in extracts can be added. Moreover, vegetable substances of the most different varieties either alone or mixed together can be used for the latter. Finally other substances may be added which are adapted to exert a favorable influence on the process. The proportions to be used must be ascertained by trial.

According to the new procedure large crystals of salammoniac can also be obtained from such salammoniac solutions, which contain other salts as well as ammonium chloride, as for example sodium chloride.

I claim:

1. The method of producing big crystals, which consists in adding vegetable substances to salt solutions, concentrating the salt solutions by evaporating at raised temperature, allowing said salt solutions to cool slowly, removing the formed crystals from the mother liquor and centrifugating and drying such crystals.

2. The method of producing big crystals, which consists in adding extracts of vegetable substances to salt solutions, concentrating the salt solutions by evaporating at raised temperature, allowing said salt solutions to cool slowly, removing the formed crystals from the mother liquor and centrifugating and drying such crystals.

3. The method of producing big crystals, which consists in adding vegetable substances to hot salt solutions, concentrating the salt solutions by evaporating at raised temperature, allowing said salt solutions to cool slowly, removing the formed crystals from the mother liquor and centrifugating and drying such crystals.

4. The method of producing big crystals, which consists in adding extracts of vegetable substances to hot salt solutions, concentrating the salt solutions by evaporating at raised temperature, allowing said salt solutions to cool slowly, removing the formed crystals from the mother liquor and centrifugating and drying such crystals.

5. The method of producing big crystals, which consists in adding vegetable substances to hot, concentrated salt solutions, allowing said salt solutions to cool slowly, removing the formed crystals from the mother liquor and centrifugating and drying such crystals.

6. The method of producing big crystals, which consists in adding extracts of vegetable substances to hot concentrated salt solutions, allowing said salt solutions to cool slowly, removing the formed crystals from the mother liquor and centrifugating and drying such crystals.

7. The method of producing big crystals, which consists in adding dried vegetable substances to hot salt solutions, concentrating the salt solutions by evaporating at raised temperature, allowing said salt solutions to cool slowly, removing the formed crystals from the mother liquor and centrifugating and drying such crystals.

8. The method of producing big crystals, which consists in adding extracts of dried vegetable substances to hot salt solutions, concentrating the salt solutions by evaporating at raised temperature, allowing said salt solutions to cool slowly, removing the formed crystals from the mother liquor and centrifugating and drying such crystals.

9. The method of producing big crystals, which consists in adding extracts of vegetable substances mixed with a quantity of an acid to hot salt solutions, concentrating the salt solutions by evaporating at raised temperature, allowing said salt solutions to cool slowly, removing the formed crystals from the mother liquor and centrifugating and drying such crystals.

10. The method of producing big crystals, which consists in adding extracts of vegetable substances to acidulated hot salt solutions, concentrating the salt solutions by evaporating at raised temperature, allowing said salt solutions to cool slowly, removing the formed crystals from the mother liquor and centrifugating and drying such crystals.

11. The method of producing big crystals, which consists in adding extracts of vegetable substances mixed with a quantity of an acid to acidulated hot salt solutions, concentrating the salt solutions by evaporating at raised temperature, allowing said salt solutions to cool slowly, removing the formed crystals from the mother liquor and centrifugating and drying such crystals.

12. The method of producing big crystals of ammonium chloride, which consists in adding to a hot acidulated aqueous solution of ammonium chloride an extract produced by digesting vegetable matter in hot water having an addition of a suitable acid, cooling slowly in a closed receptacle, removing the mother liquor and removing and drying the obtained crystals.

13. As commercial products, crystals obtained by adding vegetable substances to salt solutions, concentrating the salt solutions by evaporating at raised temperature, allowing said salt solutions to cool slowly, removing the formed crystals from the mother liquor and centrifugating and drying such crystals.

14. As commercial products, crystals obtained by adding extracts of vegetable substances to hot salt solutions, concentrating the salt solutions by evaporating at raised temperature, allowing said salt solutions to cool slowly, removing the formed crystals from the mother liquor and centrifugating and drying such crystals.

15. As a commercial product, crystals of ammonium chloride obtained by mixing a solution of ammonium chloride at raised temperature with an extract produced by digesting vegetable matter in hot water having an addition of an acid, cooling slowly in a closed tank, removing the mother liquid and removing and drying the obtained crystals.

In testimony whereof I have hereunto affixed my signature.

Dr. PAUL SEIDLER.